US005172110A

United States Patent [19]

Tiefengraber

[11] Patent Number: 5,172,110

[45] Date of Patent: Dec. 15, 1992

[54] INDICATOR APPARATUS FOR THE RECOVERY OF SKIERS BURIED BY AVALANCHES

[76] Inventor: Armin Tiefengraber, Maubisstrasse 25, 4044 Kaarst 1, Fed. Rep. of Germany

[21] Appl. No.: 352,114

[22] Filed: May 15, 1989

[30] Foreign Application Priority Data

May 20, 1988 [DE] Fed. Rep. of Germany ....... 3817272

[51] Int. Cl.[5] .............................................. G01S 13/74

[52] U.S. Cl. ............................... 340/825.49; 340/573; 340/539; 342/22

[58] Field of Search .............. 340/825.49, 573, 825.54, 340/539, 825.31, 825.34, 825.32; 455/49, 70; 235/380, 382, 462, 492, 488; 40/626; 342/22, 27

[56] References Cited

U.S. PATENT DOCUMENTS

| | | | |
|---|---|---|---|
| 3,118,145 | 1/1964 | Nee | 455/49 |
| 4,231,114 | 10/1980 | Dolikian | 455/49 |
| 4,331,957 | 5/1982 | Erander et al. | 342/22 |
| 4,354,275 | 10/1982 | Bouyssounouse et al. | 340/539 |
| 4,476,469 | 10/1984 | Lander | 340/825.49 |
| 4,491,971 | 1/1985 | Webb et al. | 340/539 |
| 4,538,059 | 8/1985 | Rudland | 235/462 |
| 4,598,272 | 7/1986 | Cox | 340/539 |
| 4,736,196 | 4/1988 | McMahon et al. | 340/539 |
| 4,822,990 | 4/1989 | Tamada et al. | 340/825.32 |
| 4,837,568 | 6/1989 | Snaper | 340/825.49 |
| 4,850,031 | 7/1989 | Allsop et al. | 340/573 |

FOREIGN PATENT DOCUMENTS

| | | | |
|---|---|---|---|
| 2352807 | 4/1975 | Fed. Rep. of Germany . | |
| 2425444 | 12/1975 | Fed. Rep. of Germany . | |
| 2437464 | 2/1976 | Fed. Rep. of Germany . | |
| 2437981 | 2/1976 | Fed. Rep. of Germany . | |
| 2545066 | 4/1976 | Fed. Rep. of Germany . | |
| 3109283 | 10/1982 | Fed. Rep. of Germany . | |
| 3211381 | 10/1983 | Fed. Rep. of Germany . | |
| 514897 | 12/1971 | Switzerland . | |
| 2082804 | 6/1981 | United Kingdom | 340/825.31 |

*Primary Examiner*—Donald J. Yusko
*Assistant Examiner*—Peter S. Weissman
*Attorney, Agent, or Firm*—Felfe & Lynch

[57] ABSTRACT

Indicator apparatus used for recovery of skiers buried by avalanches, includes cooperating transmitters and receivers carried by skiers and by search and rescue personnel. The indicator device carried by a skier is actively powered and is combined to form a single unit with a ski pass.

8 Claims, 1 Drawing Sheet

INDICATOR APPARATUS FOR THE RECOVERY OF SKIERS BURIED BY AVALANCHES

BACKGROUND OF THE INVENTION

This invention relates to an indicating device for the recovery of skiers buried by avalanches, using a search and rescue system which operates with transmitters and receivers.

Skiing is becoming a widespread sport which is increasing in popularity. Existing ski resorts are frequently very large. Due to the increasing popularity of the sport, these ski areas are expanding. Completely new areas are constantly being developed.

The danger of skiers becoming the victims of avalanches is increasing, particularly as the willingness of skiers to take risks is also increasing. The existing, marked ski runs or pistes are frequently being left behind in order to enjoy the pleasures of deep powder. For these kinds of areas there is often an increased danger of avalanches. Therefore, the rapid recovery of victims of skiing accidents is a demand which is becoming more and more urgent not only for the skiers but for the operators of the ski resorts as well. The technical means known to date have not been able to fulfill this demand satisfactorily, especially in view of the fact already mentioned that skiing has become a sport of such broad popularity.

Search and rescue systems operating with transmitters and receivers as such are known. These include a direction finding and search device normally used by search teams or rescue organizations and which is equipped with a transmitter and a receiver. The power supply of this device is not problematic, because the device can be supplied power either by the mains or, if it is only used in the course of a rescue action, by rechargeable batteries. The batteries in the device can thus be charged or replaced before each employment.

Each endangered person is equipped with an indicator device, which contains a receiver tuned to the frequency of the search transmitter, as well as a transmitter. If there is an emergency, a signal is transmitted with the aid of the search device. If such a signal is received by the receiver of the indicator, the indicator-transmitter is switched on. The signals of this transmitter are received by the receiver of the search device. Using these signals the location of the avalanche victim can be quickly found.

One basic problem exists with respect to the power supply of indicator devices of this type as noted in Swiss Patent No. 514 897 and the German Patent Publication No. 25 45 066. These indicators must be equipped with their own power supply, such as a battery, to realize a sufficient transmission range (active operation of the indicator). The constant operation of the indicator leads to the rapid discharge of the battery, so that the function of the indicator can no longer be fulfilled. If the indicator can be switched on and off manually, then the danger exists that the bearer of the indicator will forget to switch the device on. To solve this problem, it has been suggested that batteries be placed in the soles of the ski boots, which is inconvenient and problematic, as indicated in the German Patents Nos. 24 25 444 and 24 37 981 and that complicated battery charging systems be set up in areas where endangered skiers congregate, as indicated in the German Patent No. 31 09 283. In the case of skiing, a sport practiced by large numbers of people, such systems are impractical due to their complexity and the high cost. Consequently, these systems have not been able to penetrate the market. Although indicators are known which operate passively, i.e. indicators without their own power source as disclosed in the German Patent No. 23 52 807 as well as the German Patent Publication Nos. 24 37 464 and 32 11 381, these devices are not suitable for locating skiers buried by avalanches since the transmitters of such indicators have only a very short transmission range.

SUMMARY OF THE INVENTION

A principal object of the present invention is to provide an indicating device of the type described above which ensures the rapid recovery of buried skiers with a high degree of certainty.

A further object of the present invention is to offer every skier the possibility of using a search and rescue system in a simple manner.

These objects, as well as other objects which will become apparent from the discussion that follows, are achieved by designing the indicator as an active, powered device and combining the indicator with a ski pass to form a single unit.

Ski passes are issued where the lift tickets are sold and allow the skier to use the lift system of a ski resort. The period of validity is limited, normally for the duration of the skiing holiday, for example one or two weeks.

Combining the indicator with a ski pass into one single unit offers the possibility for each skier of a ski resort who is issued a ski pass to be simultaneously equipped with an indicating device. High requirements for maintaining the battery charge no longer have to be met since the batteries only have to remain charged for the time that the pass remains valid.

Information regarding the period of validity of the ski pass also provides the necessary information for monitoring the battery used in this combination, ski pass and indicator, so that the danger of using old and consequently weak batteries does not exist.

The particular advantage of the invention — that is, the combination of an indicator with a ski pass — solves the problem of how a large number of skiers can be equipped with an indicator so that each skier can make use of an existing search and rescue system. For example, it can be left up to the individual skier whether he or she purchases a ski pass with or without an indicator. At a time of increased danger due to avalanches there is the advantage of selling only ski passes with indicators so that the operator of a ski resort is in a better position to comply with his responsibility for the safety of the skiers.

Figure 1:
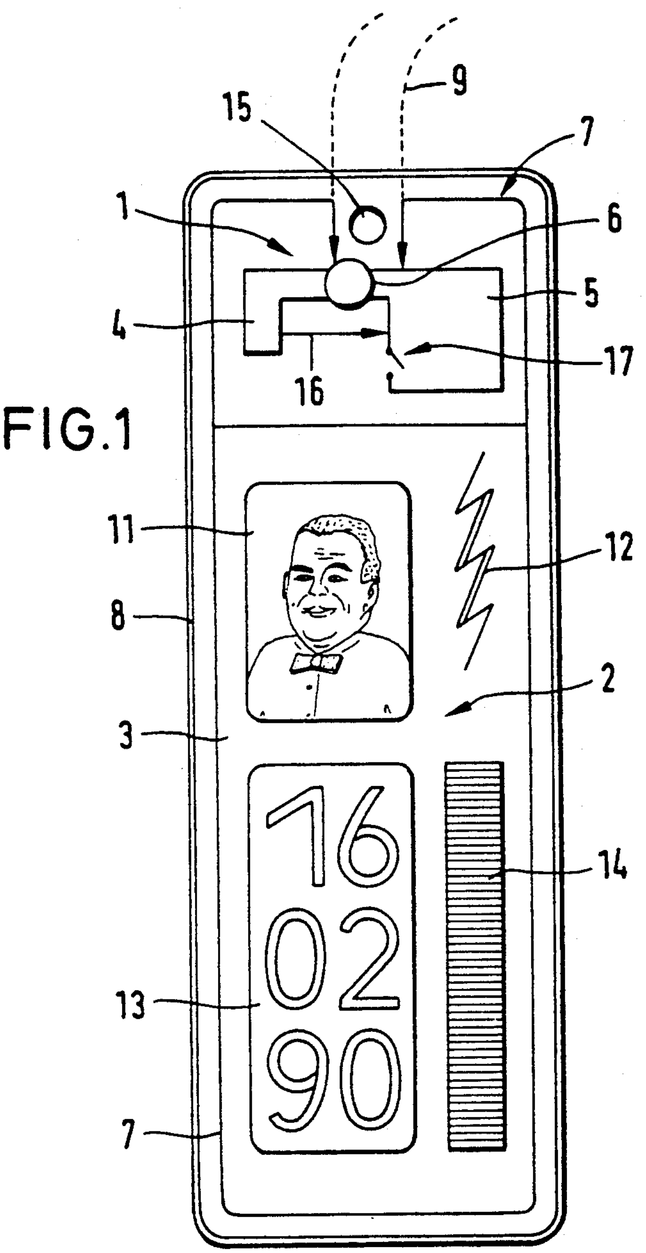
FIG. 1 is a top view of a device which is a combination ski pass and (schematically depicted) an indicator.

FIG. *2a* and *2b* are a schematic sectional views of the device shown in FIG. 1 in the region of the battery.

DETAILED DESCRIPTION OF THE DRAWINGS

As can be seen in FIG. 1, the indicator 1 and the ski pass 2 are jointly housed in a plastic case 3. The indicator 1 includes the receiver 4, the transmitter 5 and the power source 6 (a battery). The antenna required for the operation of transmitter 5 and receiver 4 is formed as a wire loop 7 and runs approximately parallel to the heat-sealed edge 8 of the plastic case 3.

As an alternative, the cord used for fastening the unit indicator/ski pass to the body of skier can also be used as an antenna. This alternative is depicted by dashed lines in FIG. 1 as a cord fastened to the case 3 and designated 9.

The ski pass 2 depicted in the design example has several fields, in which a photo 11, label 12, period of validity 13 and a code 14 can be included. The code 14 can be read by an automatic checking device which can be set up at a lift access point and serve, for example, to open a turnstile. The reference numeral 15 indicates a ring which can be used, for example, to fasten the indicator 1/ski pass 2 combination to the clothing of the skier, when an antenna in the form of the cord 9 is not present.

The unit depicted in the FIG. 1 will be placed in its finished form, for example in the lift ticket sales outlet, after the ski pass has been provided with photo, period validity, and coded strip. A plastic case sealed on three sides, in which the indicator 1 is already inserted, is used for this purpose. The ski pass 2 is then inserted. Finally, the fourth side of the plastic case is sealed, preferably heat sealed, to prevent tampering.

In accordance with the invention, the indicator 1 is designed as an active device, i.e. the receiver 4 is constantly in receiving mode during use by the skier when a first circuit between the battery and the receiver is complete. When it receives a signal from the central locating and search device, it closes a switch 17, via the line 16, which closes a second circuit and activates the transmitter 5. The transmitted signals can be received and registered by the central locating device.

Figure 2:
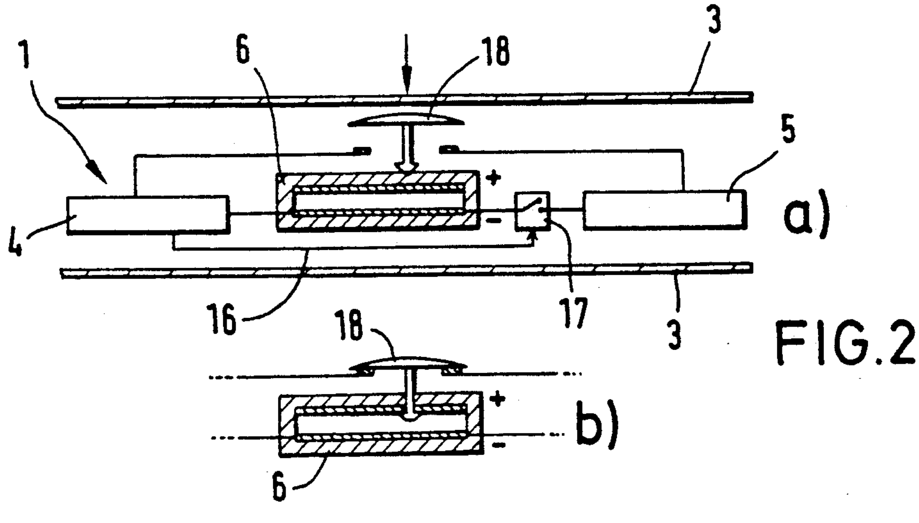

For this reason, it is necessary to connect the receiver 4 with the battery 6 before sealing the case 3. A possible method for accomplishing this is shown in FIG. 2*a* and 2*b*. A circuit element 18, which is in the shape of a thumbtack, is assigned to the battery 6, of which one pole is connected to the receiver 4 and, via switch 17, to the transmitter 5. Due to pressure — e.g., applied by a roller during heat sealing — the pin of this circuit element penetrates the battery 6 and makes contact with the other pole of the battery 6 (FIG. 2*b*). At the same time, contacts are closed between the circuit element 18 and the supply lines leading to the receiver 4 and the transmitter 5. The circuit element 18 thus completes the first circuit between the battery and the receiver, thereby actively powering the receiver means. The circuit element 18 also completes a second circuit between the battery and the transmitter, but for switch 17. Other devices which fulfill the same purpose are also known and can be used. A known example consists of spring contacts, between which a strip of insulating material is placed as long as the receiver 4 is to be switched off. This strip is removed in order to switch on the receiver 4.

After the receiver 4 is switched on, a function test is carried out to check the battery charge as well as the switching on and off of the emergency transmitter using the indicator receiver. The latter test is conducted using the search frequency in order to check the transmitting performance of the indicator transmitter. Such a function test must be carried out in an enclosed metal chamber, so that indicator receivers and senders in the vicinity are not activated.

The capacity of the energy source 6 should match the period of validity of the respective ski pass, whereby it should also be considered that the transmitter 5 transmits its responding signals for approximately 6 to 8 hours. In accordance with this purpose, the device consisting of the indicator 1 and the ski pass 2 is designed to be disposable, so that faults in function due to incorrect usage, use of weak batteries and similar errors are ruled out. For reasons relating to environmental protection, the device here according to the invention should be collected and disposed of by the ski pass sales outlet after expiration of the validity period. This goal can be achieved with the aid of a suitable deposit charge.

There has thus been shown and described a novel indicator device for the recovery of skiers buried by avalanches which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. Indicator apparatus for recovery of skiers buried by avalanches with the help of a search and rescue system having a signal transmitter and signal receiver, said apparatus comprising:

a substantially flat case having indicia means therein which serves as a ski pass, a receiver means in said case for receiving a signal from said transmitter of said search and rescue system, transmitter means in said case for transmitting a signal for reception by said signal receiver of said search and rescue system, antenna means for use in conjunction with said receiver means and said transmitter means, battery means in said case for powering said receiver means and said transmitter means, said battery means having two poles and cover means over said poles, circuit element means comprising conductive penetrating means in said case which penetrates said cover means to contact a pole of said battery and complete a first circuit between said battery means and said receiver means, thereby actively powering said receiver means, and switch means in said case for completing a second circuit between said battery means and said transmitter means, said switch means being closed upon completion of said first circuit and upon reception of said signal from said transmitter of said search and rescue system.

2. Indicator apparatus as in claim 1 wherein said circuit element means connects one pole of said battery means to said transmitter means when said first circuit between said battery means and said receiver means is completed, said switch means connecting said other pole to complete the second circuit between the battery means and the transmitter means upon reception of the signal from the transmitter of the search and rescue system.

3. Indicator apparatus as in claim 1 wherein, upon penetrating said cover means, said conductive penetrating means also closes a circuit between said battery and said transmission means, but for said switch means, which remains open until a signal is received by said reception means.

4. Indicator apparatus as in claim 1 wherein said conductive penetrating means has anti-back out means whereby said circuit between said battery and said receiver remains closed once said pole is contacted.

5. Indicator apparatus as in claim 4 wherein said anti-back out means comprises barb means which penetrates said pole.

6. Indicator apparatus as in claim 1 wherein said case is heat sealable, whereby said case may be sealed upon incorporating said indicia means, said circuit element means being adapted so that said conductive penetrating means penetrates said battery during sealing of said case.

7. Indicator apparatus as in claim 1 wherein said antenna means comprises a wire loop in said case about the periphery thereof.

8. Indicator apparatus as in claim 1 wherein said antenna means comprises a wire loop in a cord external to said case.

* * * * *